(12) United States Patent  
Ogura et al.

(10) Patent No.: US 7,171,320 B2
(45) Date of Patent: Jan. 30, 2007

(54) COORDINATE MEASURING SYSTEM AND METHOD OF CORRECTING COORDINATES MEASURED IN COORDINATE MEASURING MACHINE

(75) Inventors: Katsuyuki Ogura, Utsunomiya (JP); Kozo Sugita, deceased, late of Utsunomiya (JP); by Ayako Sugita, legal representative, Utsunomiya (JP); Hirokazu Michiwaki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 75 days.

(21) Appl. No.: 11/046,978

(22) Filed: Jan. 31, 2005

(65) Prior Publication Data

US 2005/0166412 A1   Aug. 4, 2005

(30) Foreign Application Priority Data

Feb. 2, 2004   (JP)   ............................. 2004-025942

(51) Int. Cl.
*G06F 19/00* (2006.01)
(52) U.S. Cl. .......................................... 702/95; 702/152
(58) Field of Classification Search ................. 702/95, 702/97, 105, 150–153, 157–159; 33/502; 73/1.01, 1.79; 700/193, 262
See application file for complete search history.

(56) References Cited

U.S. PATENT DOCUMENTS 5,579,246 A * 11/1996 Ebersbach et al. ............ 702/95
6,671,650 B2 * 12/2003 Ogura et al. ................ 702/152
2002/0048027 A1 * 4/2002 Pettersen et al. ........... 356/614

FOREIGN PATENT DOCUMENTS

JP      07-146130      6/1995
JP      08-229774      9/1996

* cited by examiner

*Primary Examiner*—John Barlow
*Assistant Examiner*—John Le
(74) *Attorney, Agent, or Firm*—Rankin, Hill, Porter & Clark LLP (57) ABSTRACT

Geometrical errors in a coordinate measuring machine are measured while works with various weights are mounted on the coordinate measuring machine. Compensation parameters are derived from measured results per a weight of a work and stored. A compensation parameter corresponding to a weight of a work to be measured is appropriately read out to correct measured coordinates of the work to be measured.

10 Claims, 5 Drawing Sheets

COORDINATE MEASURING SYSTEM AND METHOD OF CORRECTING COORDINATES MEASURED IN COORDINATE MEASURING MACHINE

CROSS-REFERENCE TO PRIOR APPLICATION

This application is based upon and claims the benefit of priority from the prior Japanese Patent Application. No. 2004-25942, filed on Feb. 2, 2004, the entire content of which is incorporated herein by reference.

BACKGROUND OF THE INVENTION

1. Field of the Invention

The present invention relates to a method of correcting coordinates measured in a coordinate measuring machine. More particularly, it relates to a coordinate measuring system and method of correcting measured coordinates when a work with a weight is mounted on a base in a coordinate measuring machine.

2. Description of the Related Art

A variety of probes are employed in a coordinate measuring machine for measurements within a scale coordinate system, which includes reference scales arranged along axes that configure a three-dimensional measuring space. To provide the coordinate measuring machine with an improved measurement precision, a structure thereof is required to have a higher static stiffness. In addition, introduction of a software spatial precision correcting technology can reduce geometrical errors as low as possible to support higher precision.

Figure 4:
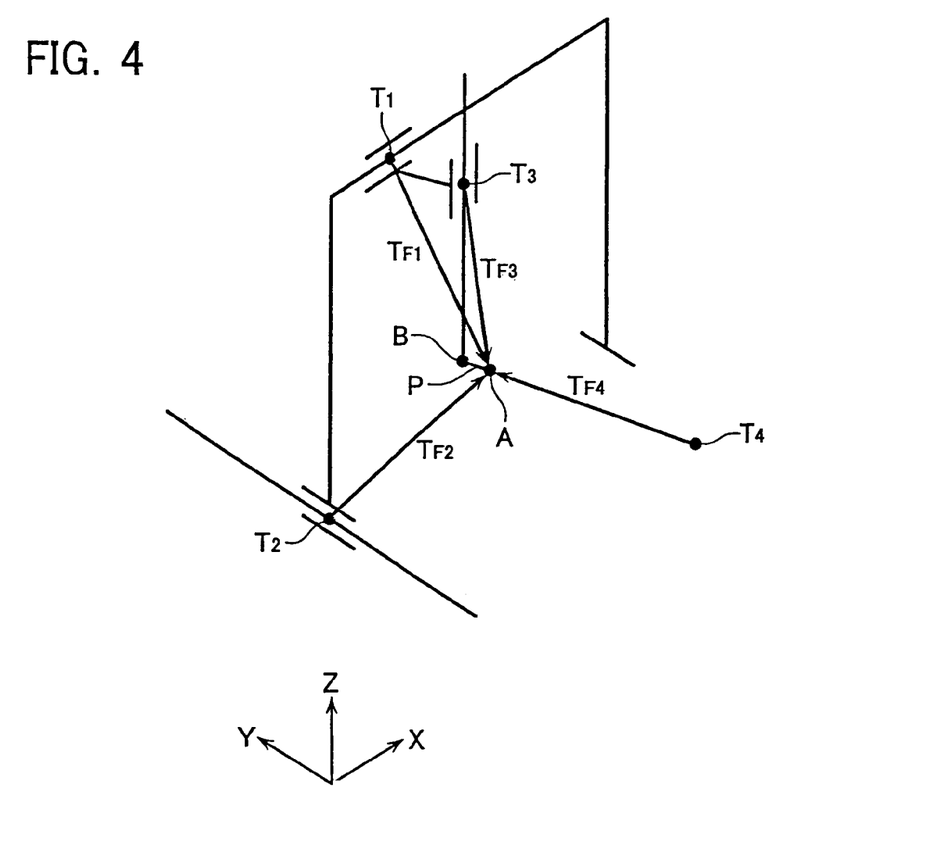
FIG. 4 shows a kinematic model illustrative of geometrical errors in the coordinate measuring machine.

The coordinate measuring machine has geometrical errors, including scale errors, straightness errors, and angular errors such as pitching and yawing on axes within an orthogonal coordinate system in a kinematic model, as shown in FIG. 4. These errors are grouped as follows with a total of 21 error factors.

| | |
|---|---|
| Scale errors on axes: | 3 |
| Horizontal straightness errors on axes: | 3 |
| Vertical straightness errors on axes: | 3 |
| Pitching errors on axes: | 3 |
| Yawing errors on axes: | 3 |
| Rolling errors on axes: | 3 |
| Angular errors between axes: | 3 |

In general, as geometrical errors measured on CMM (Coordinate Measuring Machine) contain influential factors such as angular errors, handling these as errors on axial references requires a process of error separation. A technology has been known to execute error separation using a kinematic model as shown in FIG. 4 (see JP-A 7-146130, Paragraphs 0002–0007 and FIG. 4). This kinematic model is not only employed for error separation when a correction parameter is computed. It is also employed for a process of conversion of each correction parameter into an error in a coordinate space when correction is executed.

Through the above processes, even in the presence of errors on axes, measurement and correction of the errors can reduce geometrical errors in CMM and provide CMM with high precision.

In apparatus such as CMM, a base also serving as a Y-axis motion guide plays a particularly important role in geometrical errors. Volumetric compensation can be utilized to provide CMM with high precision. In this case, if the base also serving as the Y-axis motion guide has a geometrical error, the base deforms when a user work is mounted thereon. As a result, the Y-axis motion guide is given a variation in geometrical precision, which leads to deterioration of CMM precision. Therefore, the base is designed to have a larger thickness in the art to improve the static stiffness of the base to increase the user's maximum loading weight. Accordingly, consideration is required for the thickness of the base on a basis of the maximum loading weight for a user work. This results in a longer delivery time and a larger cost. In particular, the recent increased use in measurement of large mold works desires CMM capable of measuring a 5 ton-10 ton work.

The present invention has been made in consideration of such the point and accordingly has an object to provide a coordinate measuring machine capable of achieving measurements with high precision depending on user works and method of correcting a measuring space without alternation of the thickness of the base.

SUMMARY OF THE INVENTION

A first aspect of the present invention provides a method of correcting coordinates measured in a coordinate measuring machine, comprising the steps of: storing compensation parameters per a weight of a work in a storage unit, the compensation parameters being derived from geometrical errors in a coordinate measuring machine, the geometrical errors being measured while works with various weights are mounted on the coordinate measuring machine; entering a weight of a work to be measured; reading from said storage unit a compensation parameter corresponding to said weight of said work entered at the previous step; and correcting measured coordinates of said work to be measured based on said compensation parameter read at the previous step.

A second aspect of the present invention provides a coordinate measuring system, comprising: a coordinate measuring machine configured to measure a work to be measured mounted on a base within a three-dimensional measuring space; a controller operative to drive-control the coordinate measuring machine and fetch a necessary measured value from the coordinate measuring machine; and a host computer operative to process the measured value fetched through the controller. The coordinate measuring system further comprises a storage unit configured to store compensation parameters per a weight of a work derived from geometrical errors in the coordinate measuring machine, the geometrical errors being measured while works with various weights are mounted on abase of the coordinate measuring machine; and an input unit configured to enter weight information of the work. In this case, measured coordinates of the work to be measured are corrected based on the entered weight information of the work and the compensation parameters stored in the storage unit.

The storage unit may be provided in the controller. In this case, the controller is operative to correct the measured coordinates of the work to be measured by switching among the compensation parameters based on the entered weight information of the work. The storage unit may also be provided in the host computer. In this case, the host computer is operative to send a compensation parameter corresponding to the weight of the work based on the entered weight information of the work, and the controller is operative to correct the measured coordinates of the work to be measured based on the compensation parameter received from the host computer.

The input unit may be manually operative to enter the weight information of the work into the host computer. Alternatively, it may include a weight counter integrated in the coordinate measuring machine, and a unit operative to send the weight information of the work detected at the weight counter to the host computer.

The base of the coordinate measuring machine may also serve as a Y-axis motion-guide, and the geometrical errors may contain a Y-axis angular error caused by deformation of the base.

In the present invention, geometrical errors in a coordinate measuring machine are measured while works with various weights are mounted on the coordinate measuring machine. Compensation parameters are derived from measured results per a weight of a work and stored. A compensation parameter corresponding to a weight of a work to be measured is appropriately read out to correct measured coordinates of the work to be measured. Accordingly, coordinate values can be corrected precisely even if the work weight deforms the base. Thus, it is possible to achieve measurements with high precision depending on user works without alternation of the thickness of the base.

Note that the coordinate measuring machine in this specification is not limited to one measuring coordinates. It may be one measuring surface texture. It also includes a surface roughness measuring machine, an undulation measuring machine, a profile measuring machine, a roundness measuring machine, and a straightness measuring machine.

DETAILED DESCRIPTION OF THE INVENTION

Embodiments of the present invention will now be described with reference to the accompanying drawings.

Figure 1:
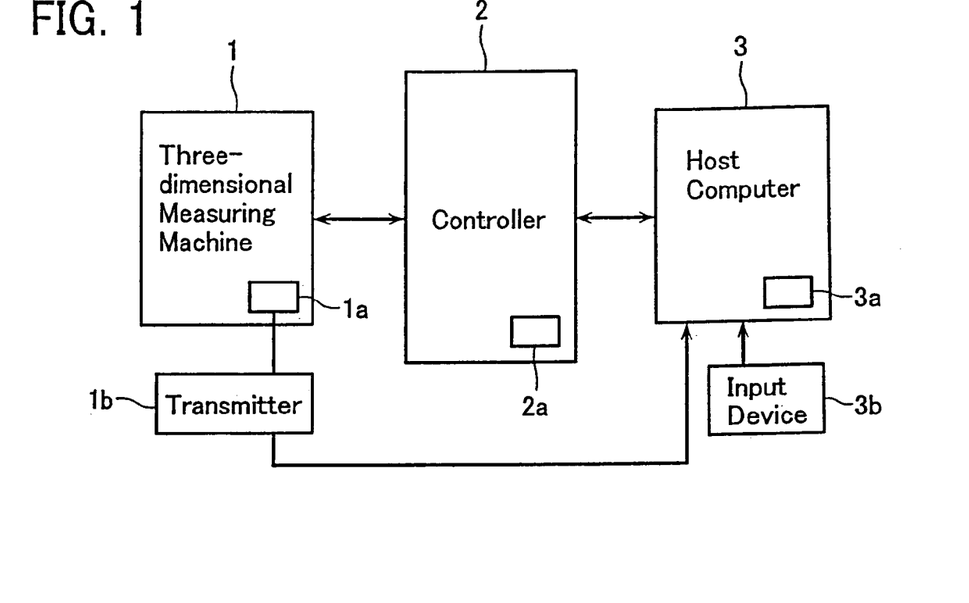
FIG. 1 is a block diagram illustrating a configuration of a coordinate measuring system according to an embodiment of the present invention.

FIG. 1 is a block diagram illustrating a configuration of a CNC (Computerized Numerical Control) coordinate measuring system according to an embodiment of the present invention.

The CNC coordinate measuring system comprises a coordinate measuring machine 1, a controller 2 operative to drive-control the coordinate measuring machine 1 and fetch a necessary measured value from the coordinate measuring machine 1, and a host computer 3 operative to process the measured value fetched through the controller 2. The coordinate measuring machine 1 includes a weight counter 1a for measuring a weight of a work, and a transmitter 1b for sending the weight data to the host computer 3. The controller 2 includes a memory device 2a for storing data. The host computer 3 includes a memory device 3a for storing data and an input device 3b.

Figure 2:
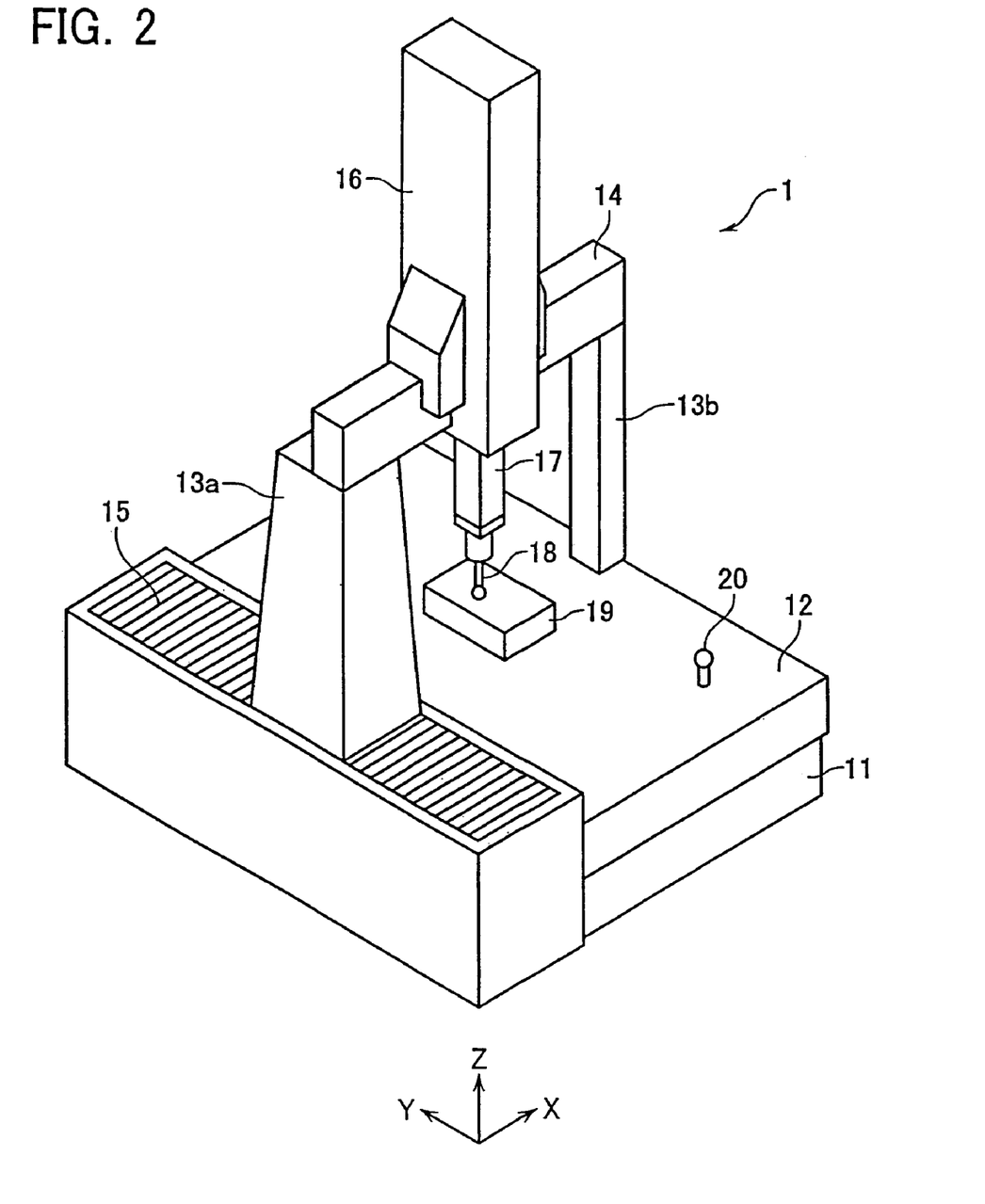
FIG. 2 is a perspective view illustrating a configuration of a coordinate measuring machine in the same system.

The coordinate measuring machine 1 may be configured as shown in FIG. 2.

On a vibration isolating stand 11, a base 12 is mounted such that the upper surface thereof serves as a base plane coincident with a horizontal plane. A pair of beam supports 13a and 13b stand up from both ends of the base 12 such that the upper ends of the beam supports support a beam 14 extending in the X-axis direction. A Y-axis driving mechanism 15 drives the lower end of the beam support 13a in the Y-axis direction. An air bearing is employed to support the lower end of the beam support 13b movably on the base 12 in the Y-axis direction. The beam 14 supports a column 16 extending in the vertical direction (Z-axis direction). The column 16 is driven along the beam 14 in the X-axis direction. The column 16 is provided with a spindle 17 that can be driven along the column 16 in the Z-axis direction. A touch probe 18 is attached to the lower end of the spindle 17. When the probe 18 touches a work 19 mounted on the base 12, the probe 18 provides a touch signal to the controller 2, and the controller 2 fetches XYZ coordinate values at the time. A master ball 20 is attached to a certain location on the base 12 to construct a mechanical coordinate system.

The following description is given to a method of correcting spatial errors using the CNC coordinate measuring system.

(1) Advance Registration

Figure 3:
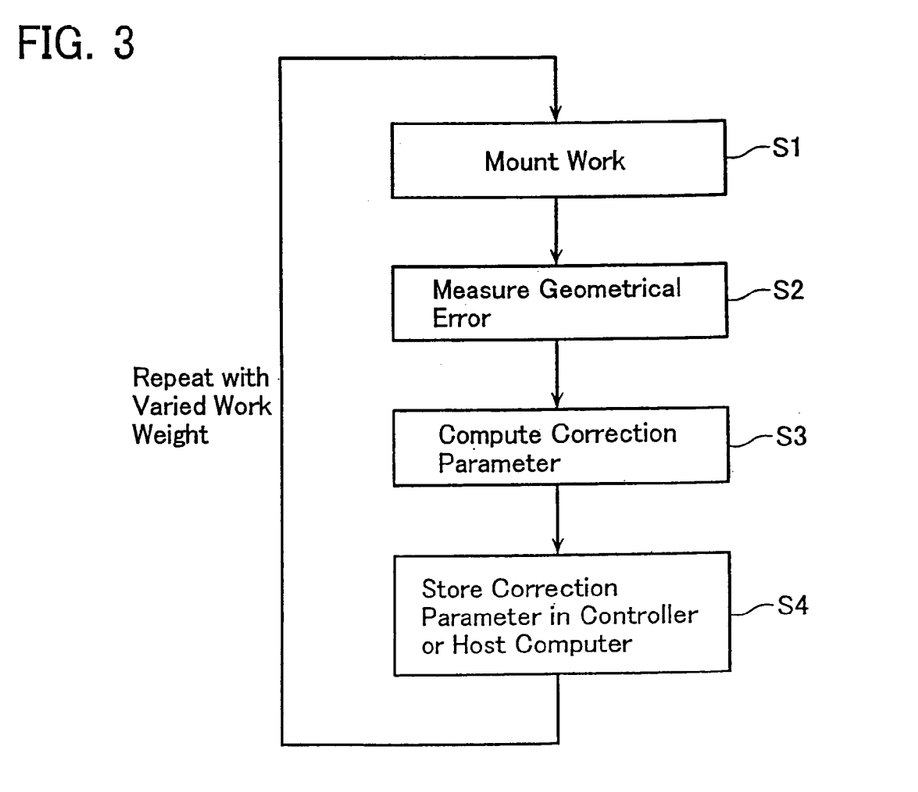
FIG. 3 is a flowchart illustrating a process of advance registration in the same system.

FIG. 3 is a flowchart illustrating a process of advance registration.

In the advance registration, the weight W of the work 19 mounted on the base 12 in the coordinate measuring machine 1 is switched among 0, 5 ton, 10 ton, . . . to compute compensation parameters in the respective cases for spatial error correction. The weight W=0 is a state when no work 19 is mounted.

In a detailed description with reference to FIG. 3, the work 19 with the weight W is first mounted on the base 12 in the coordinate measuring machine 1 (S1), and then geometrical errors in the coordinate measuring machine 1 are measured (S2). Thus, the 21 pieces of geometrical errors described above are measured, and 21 types of compensation parameters are derived from the 21 pieces of geometrical errors measured (S3). The compensation parameters computed are stored in the memory device 2a in the controller 2 or the memory device 3a in the host computer 3 (S4). If the compensation parameters are stored in the memory device 2a in the controller 2, there is a restriction on the storage capacity while the host computer 3 is not required to transfer a compensation parameter every time when the work weight Varies. This is advantageous to switch among the compensation parameters faster. To the contrary, if the compensation parameters are stored in the storage device in the host computer 3, storage in a mass hard disc removes the restriction from the storage capacity. No restriction the storage capacity allows previous preparation of compensation parameters finely corresponding to work weights.

The measurement of geometrical errors in the coordinate measuring machine 1 (S2) is described next in detail.

FIG. 4 shows a kinematic model illustrative of a structure of the coordinate measuring machine 1. In this figure, T1, T2, T3 and T4 denote a fulcrum on X-axis, a fulcrum on Y-axis, a fulcrum on Z-axis and a master ball center point, respectively. In addition, A, B and P denote a probe tip, a spindle tip and a probe vector headed from the spindle tip B toward the probe tip A. TF1, TF2, TF3 and TF4 denote vectors headed toward the probe tip A from a measurement point on X-axis, a measurement point on Y-axis, a measurement point on Z-axis and the master ball center point, respectively.

The geometrical errors to be measured include parallel errors (ex, ey, ez) and rotational errors (#epsilon#x, #epsilon#y, #epsilon#z) at a specific focused fulcrum (also serving as a rotational center) T. When (TFx, TFy, TFz) denote vectors headed from fulcrums toward the probe tip, compensation parameters (#delta#x, #delta#y, #delta#z) can be derived from the following equation (1).

$$\begin{pmatrix} \delta x \\ \delta y \\ \delta z \end{pmatrix} = \begin{pmatrix} ex \\ ey \\ ez \end{pmatrix} + \begin{pmatrix} \varepsilon x \\ \varepsilon y \\ \varepsilon z \end{pmatrix} \times \begin{pmatrix} TFx \\ TFy \\ TFz \end{pmatrix}$$

$$= \begin{pmatrix} ex \\ ey \\ ez \end{pmatrix} + \begin{pmatrix} \varepsilon y \cdot TFz - \varepsilon z \cdot TFy \\ \varepsilon z \cdot TFx - \varepsilon x \cdot TFz \\ \varepsilon x \cdot TFy - \varepsilon y \cdot TFx \end{pmatrix}$$

Equation (1)

Therefore, if there are parallel errors (T1ex, T1ey, T1ez), (T2ex, T2ey, T2ez), (T3ex, T3ey, T3ez), (T4ex, T4ey, T4ez) and rotational errors (T1#epsilon#x, T1#epsilon#y, T1#epsilon#z), (T2#epsilon#x, T2#epsilon#y, T2#epsilon#z), (T3#epsilon#x, T3#epsilon#y, T3#epsilon#z), (T4#epsilon#x, T4#epsilon#y, T4#epsilon#z) at the fulcrums on axes, T1, T2 and T3, and the reference point T4, the equation (1) can be expanded as the following equation (2).

$$\begin{pmatrix} \delta x \\ \delta y \\ \delta z \end{pmatrix} = \begin{pmatrix} \sum_{i=1}^{4} T_{iex} \\ \sum_{i=1}^{4} T_{iey} \\ \sum_{i=1}^{4} T_{iez} \end{pmatrix} + \begin{pmatrix} \sum_{i=1}^{4} (T_{i\varepsilon y}T_{Fiz} - T_{i\varepsilon z}T_{Fiy}) \\ \sum_{i=1}^{4} (T_{i\varepsilon z}T_{Fix} - T_{i\varepsilon x}T_{Fiz}) \\ \sum_{i=1}^{4} (T_{i\varepsilon x}T_{Fiy} - T_{i\varepsilon y}T_{Fix}) \end{pmatrix}$$

Equation (2)

Figure 5:
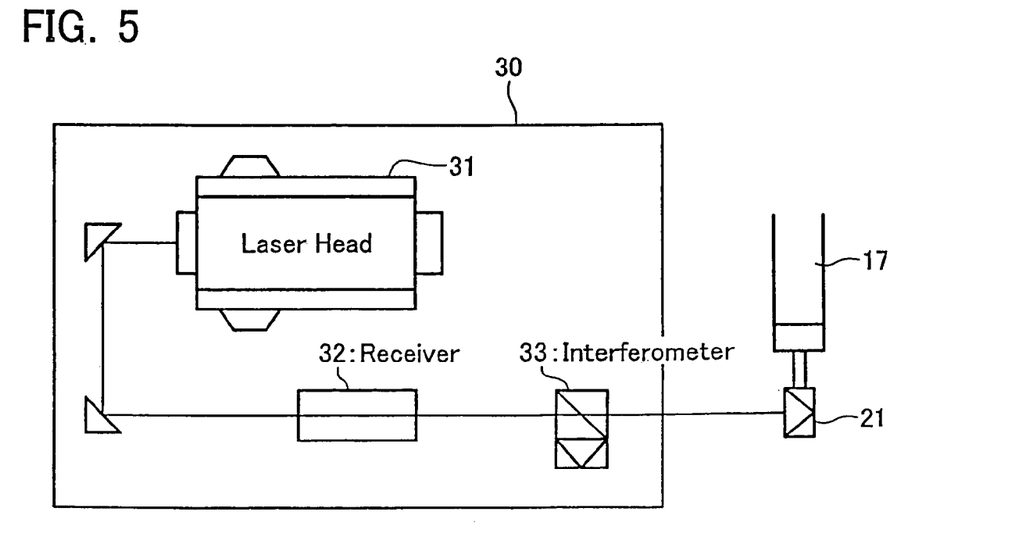
FIG. 5 shows an example of measurement of geometrical errors on the advance registration in the same system.

An actual measurement of geometrical errors can be performed as shown in FIG. 5, for example, in which an optical tool 21 for measurement is set on the tip of the spindle 17. A laser interference measuring instrument 30 is employed to measure a position of the probe tip relative to each scale value. The laser interference measuring instrument 30 includes a laser head 31 configured to emit a laser light. It also includes a receiver 32 configured to pass the laser light emitted from the laser head 31 toward the optical tool 21 and receive an incident laser light from the optical tool 21. It further includes an interferometer 33 configured to yield interference fringes when the laser light emitted from the laser head 31 interferes with the laser light reflected from the optical tool 21. When the optical tool 21 is moved along scales of XYZ, the interferometer 33 yields interference fringes at each position, which are employed to detect parallel errors and rotational errors at the probe position. Measurement of parallel errors and rotational errors throughout the three-dimensional measuring space allows computation of compensation parameters throughout the three-dimensional measuring space.

Figure 6A:
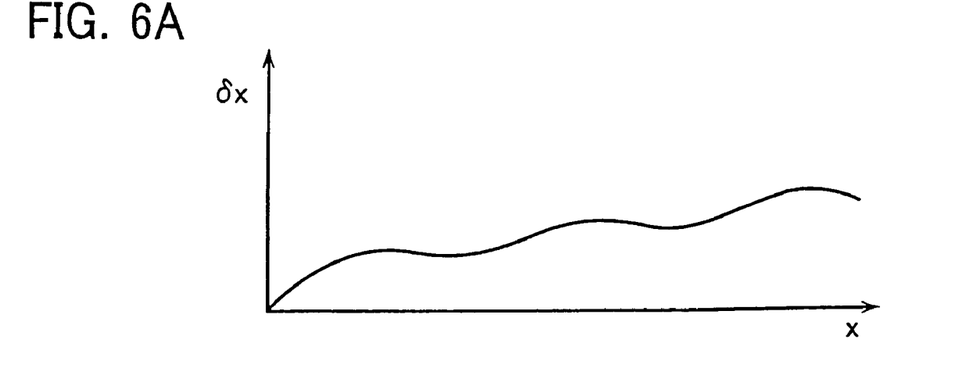
FIGS. 6A, 6B, and 6C show a method of storing compensation parameters on the advance registration.
Figure 6B:
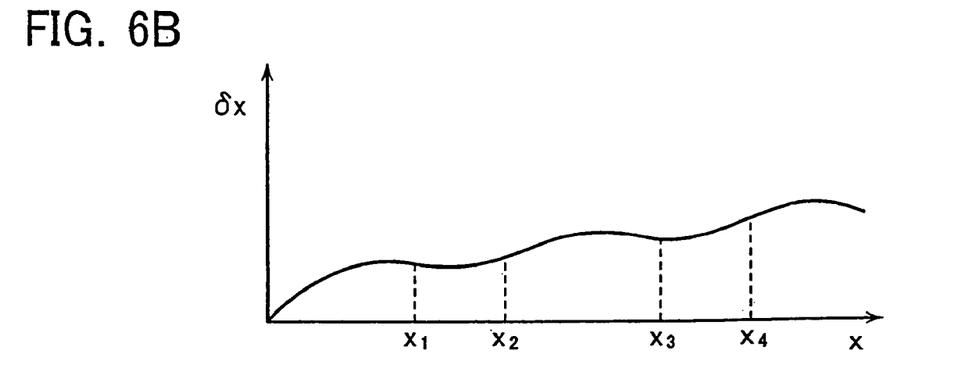
Figure 6C:
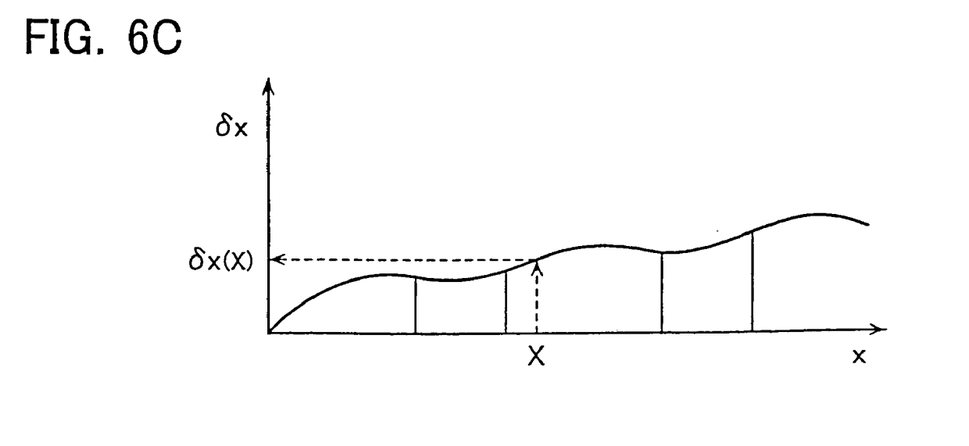

It is not practical, however, to store the whole compensation parameters within the three-dimensional measuring space. To this end, the amount of data to be stored maybe reduced as shown in FIG. 6, where a compensation parameter #delta#x along the X-axis direction is described for simplification of description. First, as shown in FIG. 6A, a compensation parameter #delta#x corresponding to an X-axis counter value x is computed. Then, as shown in FIG. 6B, based on a preset interpolating function degree, a resultant raw data curve, the number of zone division derived from the shape and a divided position, an interpolating function coefficient in each zone is determined. For example, if the interpolating function degree in each zone is equal to "2" there are three coefficients in each zone. Finally, as shown in FIG. 6C, in reading out an actual compensation parameter, a compensation parameter δx (X) relative to the counter value x is computed using the interpolating function obtained above. This operation is similarly applied to other compensation parameters on Y-axis and Z-axis. Thus, the amount of data to be stored can be greatly reduced.

In this embodiment, the weight W of the work 19 mounted on the base 12 is switched among 0, 5 ton, 10 ton, . . . to measure the geometrical errors in the respective cases as described above and compute compensation parameters for spatial error correction.

Deformation of the base 12 due to the work weight imparts the greatest influence on a Y-axis angle defined from the base 12 serving as a guide. In such the case, instead of the above measurement of geometrical errors, an angular error on Y-axis may be measured using an angle meter, for each work weight.

(2) Measurement

Figure 7:
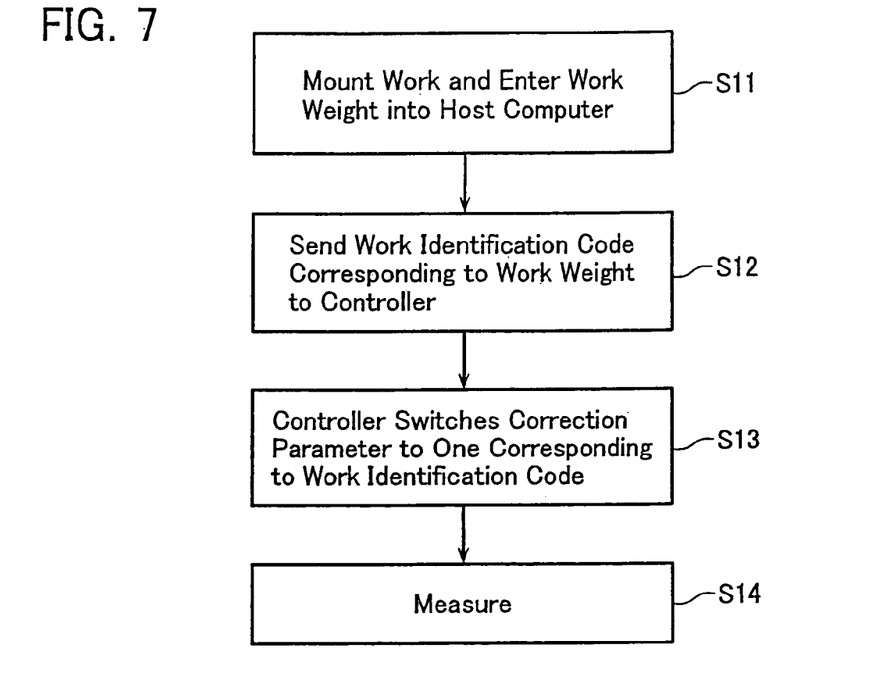
FIG. 7 is a flowchart illustrating a process of measurement in the same system.

FIG. 7 is a flowchart illustrating a flow during actual measurement thus executed in the coordinate measuring machine that stores compensation parameters for each work weight. In this embodiment the compensation parameters are stored in the controller 2 as an example.

First, the work 19 is mounted on the base 12, and the weight of the work 19 is entered into the host computer 3 (S11). The work weight may be entered into the host computer 3 manually by a worker, or may be detected automatically by a weight counter 1a integrated in the base 12, and be sent to the host computer 3.

Information about the work weight may also be entered directly into the host computer 3 using the input device 3b.

The host computer 3 sends a work identification code corresponding to the work weight to the controller 2 (S12). The controller 2 switches the compensation parameter for use in measurement to a compensation parameter corresponding to the work identification code, among the compensation parameters stored internally (S13). In an actual measurement, the switched compensation parameter is employed to correct a measured value (S14).

Figure 8:
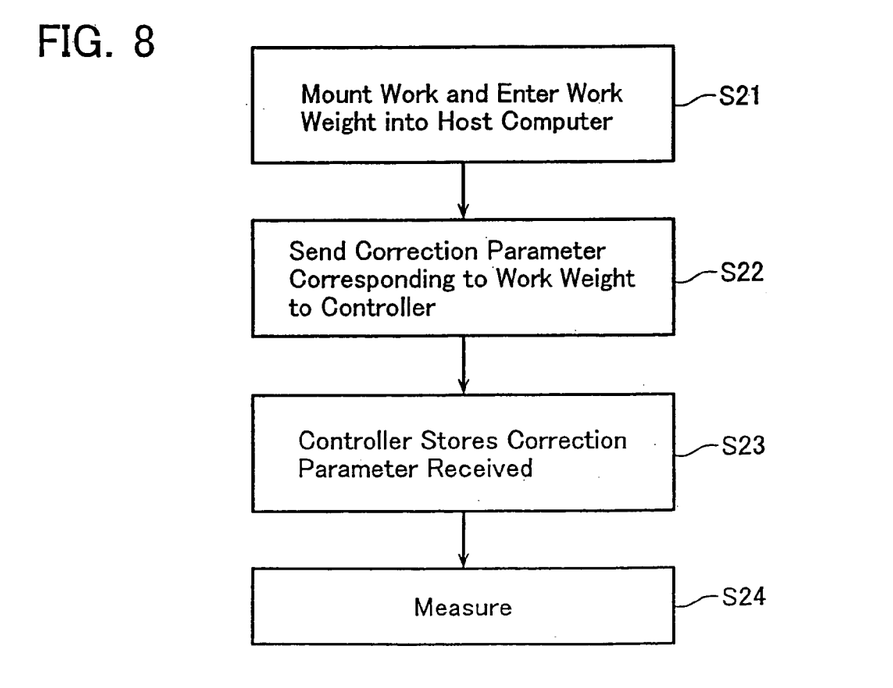
FIG. 8 is a flowchart illustrating another example of measurement in the same system.

FIG. 8 is a flowchart illustrating a flow in another embodiment of actual measurement executed in the coordinate measuring machine that stores compensation parameters per a weight of a work. In this embodiment the compensation parameters are stored in the host computer 3.

First, the work 19 is mounted on the base 12, and the weight of the work 19 is entered into the host computer 3 (S21). The work weight may be entered into the host computer 3 manually by a worker or through automatic detection by a weight counter integrated in the base 12.

The host computer 3 sends a compensation parameter corresponding to the work weight to the controller 2 (S22).

The controller 2 stores the received compensation parameter in an internal memory (S23). In an actual measurement, the stored compensation parameter is employed to correct a measured value (S24).

In the embodiment, on measurements of works with various weights, it is possible to correct coordinate values precisely and provide measurements with high precision easily. The present invention is though not limited to the embodiment.

For example, in the above embodiment the coordinate measuring machine is implemented as a conventional three-dimensional coordinate measuring machine by way of non-limiting example. Rather, it may be implemented in general surface condition measuring machines such as a surface roughness measuring machine, a surface profile measuring machine and a roundness measuring machine.

The weight counter is exemplified as integrated in the base 12 for automatic detection and entering. Alternatively, the weight counter may be integrated in the vibration isolating stand 11.

In such the case, a strain gauge of the weight counter maybe integrated in the base 12 or the vibration isolating stand 11 to automatically detect a weight based on the amount of strain caused on the base 12 or the vibration isolating stand 11.

The weight counter may measure a tilt at a portion in the measuring machine such as the base 12 or the beam support 13a, 13b and automatically detect a weight based on the amount of tilt.

As described above, in the coordinate measuring system and method of correcting coordinates measured in the coordinate measuring machine of the embodiment, the compensation parameter corresponding to the weight of the work to be measured is employed to correct the measured coordinates of the work. Therefore, it is possible to relief the restriction on the work weight in the coordinate measuring machine and to improve the work measurement precision as well. Accordingly, it is possible to improve the availability of the measuring machine and result in an improved economic efficiency.

In addition, it is possible to reduce the thickness of the base thinner than the conventional one and effect on resource conservation.

What is claimed is:

1. A method of correcting coordinates measured in a coordinate measuring machine, comprising the steps of:
    storing compensation parameters per a weight of a work in a storage unit, said compensation parameters being derived from geometrical errors in a coordinate measuring machine, said geometrical errors being measured while works with various weights are mounted on said coordinate measuring machine;
    entering a weight of a work being measured;
    reading from said storage unit a compensation parameter corresponding to said weight of said work entered at the previous step; and
    correcting measured coordinates of said work being measured based on said compensation parameter read at the previous step, and storing the corrected measurement in a host computer.

2. The method of correcting coordinates measured in a coordinate measuring machine according to claim 1, comprising the steps of:
    attaching an optical tool to part of said coordinate measuring machine;
    reflecting a laser light from a laser source on said optical tool;
    subjecting said light reflected on said optical tool to interfere with said laser light from said laser source; and
    measuring said geometrical errors based on interference fringes caused by said interference.

3. A coordinate measuring system, comprising:
    a coordinate measuring machine configured to measure a work mounted on a base within a three-dimensional measuring space;
    a controller operative to drive-control said coordinate measuring machine and fetch a necessary measured value from said coordinate measuring machine; and
    a host computer operative to process said measured value fetched through said controller, said coordinate measuring system further comprising:
    a storage unit configured to store compensation parameters per a weight of a work derived from geometrical errors in said coordinate measuring machine, said geometrical errors being measured while works with various weights are mounted on a base of said coordinate measuring machine; and
    an input unit configured to enter weight information of said work being measured,
    wherein measured coordinates of said work being measured are corrected based on said entered weight information of said work being measured and said compensation parameters stored in said storage unit.

4. The coordinate measuring system according to claim 3, wherein said storage unit is provided in said controller,
    said controller being operative to correct said measured coordinates of said work being measured by switching among said compensation parameters based on said entered weight information of said work.

5. The coordinate measuring system according to claim 3, wherein said storage unit is provided in said host computer,
    said host computer being operative to send a compensation parameter corresponding to said weight of said being measured work based on said entered weight information of said work to said controller,
    said controller being operative to correct said measured coordinates of said work being measured based on said compensation parameter received from said host computer.

6. The coordinate measuring system according to claim 3, wherein said input unit is manually operative to enter said weight information of said work being measured into said host computer.

7. The coordinate measuring system according to claim 3, said input unit including
    a weight counter integrated in said coordinate measuring machine, and
    a unit operative to send said weight information of said work being measured detected at said weight counter to said host computer.

8. The coordinate measuring system according to claim 7, wherein said weight counter is operative to measure a tilt at each part in said coordinate measuring machine to detect a weight of said work being measured based on said tilt.

9. The coordinate measuring system according to claim 3, wherein said base of said coordinate measuring machine also serves as a Y-axis motion guide,
    said geometrical errors containing a Y-axis angular error caused by deformation of said base.

10. A method of determining compensation parameters for use in correcting coordinates measured in a coordinate measuring machine, comprising the steps of:

attaching an optical tool to part of said coordinate measuring machine, reflecting a laser light from a laser source on said optical tool, subjecting said light reflected on said optical tool to interfere with said laser light from said laser source, and measuring geometrical errors in said coordinate measuring machine on said weight basis based on interference fringes caused by said interference while works with various weights are mounted on said coordinate measuring machine; and deriving compensation parameters from measured results en-per a weight of a work, and storing said compensation parameters in a storage unit.

* * * * *

UNITED STATES PATENT AND TRADEMARK OFFICE
CERTIFICATE OF CORRECTION

| | | |
|---|---|---|
| PATENT NO. | : 7,171,320 B2 | Page 1 of 1 |
| APPLICATION NO. | : 11/046978 | |
| DATED | : January 30, 2007 | |
| INVENTOR(S) | : Ogura et al. | |

It is certified that error appears in the above-identified patent and that said Letters Patent is hereby corrected as shown below:

Column 10, Line 4 (Claim 10, Line 14), delete "en-per" and insert --per--.

Signed and Sealed this

Third Day of April, 2007

JON W. DUDAS
*Director of the United States Patent and Trademark Office*